(12) United States Patent
Das et al.

(10) Patent No.: US 7,830,918 B2
(45) Date of Patent: Nov. 9, 2010

(54) METHOD OF NETWORK COMMUNICATION, AND NODE AND SYSTEM EMPLOYING THE SAME

(75) Inventors: Sujit R. Das, New Berlin, WI (US); Luis R. Pereira, Milwaukee, WI (US)

(73) Assignee: Eaton Corporation, Cleveland, OH (US)

( * ) Notice: Subject to any disclaimer, the term of this patent is extended or adjusted under 35 U.S.C. 154(b) by 371 days.

(21) Appl. No.: 11/837,072

(22) Filed: Aug. 10, 2007

(65) Prior Publication Data

US 2009/0041054 A1 Feb. 12, 2009

(51) Int. Cl.
*H04J 3/22* (2006.01)
*G06F 15/16* (2006.01)

(52) U.S. Cl. .................. 370/469; 370/465; 709/230; 709/231

(58) Field of Classification Search .................. 370/469, 370/412, 428, 394, 351, 464, 465; 709/230–234
See application file for complete search history.

(56) References Cited

U.S. PATENT DOCUMENTS

| | | | | |
|---|---|---|---|---|
| 5,278,834 A * | 1/1994 | Mazzola | ...................... | 370/469 |
| 6,081,522 A * | 6/2000 | Hendel et al. | ................ | 370/389 |
| 6,115,393 A * | 9/2000 | Engel et al. | .................. | 370/469 |
| 6,426,943 B1 * | 7/2002 | Spinney et al. | ............... | 370/235 |
| 6,700,869 B1 * | 3/2004 | Falco et al. | .................. | 370/230 |
| 6,714,553 B1 * | 3/2004 | Poole et al. | .................. | 370/412 |
| 6,741,603 B2 * | 5/2004 | Pate et al. | ................... | 370/412 |
| 7,065,050 B1 * | 6/2006 | Herbst | ......................... | 370/235 |
| 7,111,092 B1 * | 9/2006 | Mitten et al. | ................... | 710/52 |
| 7,117,308 B1 * | 10/2006 | Mitten et al. | ................. | 711/118 |
| 7,522,605 B2 * | 4/2009 | Spencer et al. | .............. | 370/394 |
| 7,676,814 B2 * | 3/2010 | Karighattam et al. | ....... | 719/319 |
| 7,688,838 B1 * | 3/2010 | Aloni et al. | .................. | 370/412 |
| 2002/0051448 A1 * | 5/2002 | Kalkunte et al. | ............ | 370/389 |
| 2002/0176430 A1 * | 11/2002 | Sangha et al. | ............... | 370/412 |
| 2004/0100980 A1 * | 5/2004 | Jacobs et al. | ................. | 370/412 |
| 2004/0156378 A1 * | 8/2004 | Walls et al. | .................. | 370/412 |
| 2006/0077993 A1 * | 4/2006 | Pereira et al. | ............... | 370/412 |
| 2006/0080455 A1 * | 4/2006 | Das et al. | ..................... | 709/231 |
| 2006/0146822 A1 * | 7/2006 | Kolakowski et al. | ........ | 370/390 |
| 2007/0162610 A1 * | 7/2007 | Un et al. | ..................... | 709/230 |
| 2007/0230486 A1 * | 10/2007 | Zafirov | ....................... | 370/401 |
| 2007/0280125 A1 * | 12/2007 | Sonnier | ...................... | 370/252 |
| 2008/0181245 A1 * | 7/2008 | Basso et al. | .................. | 370/412 |

* cited by examiner

*Primary Examiner*—Chi H Pham
*Assistant Examiner*—Robert Lopata
(74) *Attorney, Agent, or Firm*—Martin J. Moran (57) ABSTRACT

A method of network communication includes employing a communication network protocol stack with a plurality of independent communication layers providing a plurality of different corresponding services. A plurality of circular communication buffers are employed. A buffer manager is employed for the circular communication buffers, the buffer manager being independent of the independent communication layers. One of the circular communication buffers is requested from the buffer manager by one of the independent communication layers. A plurality of different operations are provided in the buffer manager to read first data from or write second data to such one of the circular communication buffers for a number of the independent communication layers.

23 Claims, 10 Drawing Sheets

P->Unroll(P)

METHOD OF NETWORK COMMUNICATION, AND NODE AND SYSTEM EMPLOYING THE SAME

BACKGROUND OF THE INVENTION

1. Field of the Invention

This invention pertains generally to methods of communication and, more particularly, to such methods employing a plurality of communication layers and communication buffers. The invention also relates to a communicating node including a plurality of communication layers and communication buffers. The invention further relates to a system including a plurality of such communicating nodes.

2. Background Information

In order to better achieve flexibility to carry many different types of information over a single system, communication systems are typically designed with a layered architecture. One example of a general layered architecture for networking protocols and distributed applications is the International Standard Organization's Open System Interconnect (ISO/OSI) model.

The ISO/OSI model comprises a communication system having seven layers, which form a communication path between a first end user and a second end user. The seven layers may be divided into two sets: (1) a set of upper layers; and (2) a set of lower layers. The upper four layers (e.g., transport, session, presentation and application layers) normally reside in application end users. A communication system may, in some cases, be defined by the lower three layers, individually known as the network layer, the data link layer and the physical layer.

Each layer is responsible for specific, defined operations in the communication process between application end users. In furtherance of these operations, each layer may communicate information with the layers above and below it through defined interfaces (although there is not always a definitive separation between layers). Thus, for example, the transport layer may operate independently of the specific operational details of the network layer, the data link layer and the physical layer below it. The set of lower layers thus operates as a transparent data pipeline to an application end user connected to the system at the transport layer interface.

A flow of data occurs between layers, such as may occur during communication between two application end users. Information may be passed between like layers of each end user through a path ultimately connected at the physical layer. The rules that govern how data is passed between like layers at each end user are collectively referred to as a "peer-to-peer protocol". A variety of different application end users operating with different peer-to-peer protocols may communicate over a communication system so long as each application end user presents the proper upper layer interface to the communication system. Conversely, an application end user may connect with any communication system having a compatible lower layer interface.

Generally, it is common that only a subset of the seven layers are employed within a network or that one or more layers are merged. Each layer employs the services of the layer below it and provides services to the layer(s) above it. Thus, for example, the network layer, which is responsible for establishing and maintaining the flow of messages between connected points in the network, is dependent upon the data link layer to provide, for example, character and message synchronization and error correction. The data link layer is, in turn, dependent upon the physical layer to actually transmit and receive information as electrical or wireless signals on the network.

Communication protocol stacks are often implemented in a layered structure, with each layer providing a certain function or service. This allows some flexibility in the implementation, enables compliance with existing standards and permits a certain degree of customization. This also enables an application to become independent from the communication mechanism and allows relatively faster implementation thereof. Preferably, the layer above accesses a set of services provided by the layer below.

U.S. Patent Application Publication No. 2006/0080455 discloses a buffer management entity (BME) in which communication layers are not responsible for managing the details of assembling and disassembling packets. Instead, the communication layers request ("lease") the data of the BME in order to reserve it. The BME employs basic operations of request, release and update. The BME includes a buffer manager class and multiple instances of a buffer class. The buffer manager class controls the assignment of individual buffers, while memory usage is independently controlled by each of those buffers. Each of the buffers has sufficient memory to store the largest possible message size handled by the layers of the communication protocol stack. The buffer manager class receives buffer requests from the discrete communication protocol stack layers, searches a list of available buffers for availability, and confirms the acceptance of the buffer request back to the requesting layer. A BME_Manager state handles three types of events: (1) BME_RequestBuffer; (2) BME_ReleaseBuffer; and (3) BME_UpdateBuffer events. The BME_Manager state replies to events from any of the layers with a BME_Buffer Reply event, which is directed to the layer that initiated the request.

A wireless communication protocol stack, for example, has two end goals. The first goal is to transmit packets initiated by the application layer at the top of the stack, and the second goal is to process a number of received packets at the bottommost layer, which received packets may be intended for the topmost application layer. For example, it is a good practice to avoid the exchange of data or services between layers not adjacent to each other.

Most of what a communication protocol stack layer does is to add bytes as headers or trailers in a existing packet (e.g., without limitation, adding a MAC header; adding a CRC to a NWK packet). There is a need, therefore, for such a layer not having to deal with the specifics of adding to or reading from such packets.

Accordingly, there is room for improvement in methods of communication employing a plurality of communication layers and communication buffers.

There is also room for improvement in communicating nodes including a plurality of communication layers and communication buffers.

There is further room for improvement in systems including a plurality of such communicating nodes.

SUMMARY OF THE INVENTION

These needs and others are met by embodiments of the invention, which deal with novel operations on BME data through circular communication buffers. For example, the disclosed Append and Prepend operations are provided such that a layer need not deal with the specifics of adding bytes as headers or trailers in a existing packet.

In accordance with one aspect of the invention, a method of network communication comprises: employing a communication network protocol stack comprising a plurality of independent communication layers providing a plurality of different corresponding services; employing a plurality of circular communication buffers; employing a buffer manager for the circular communication buffers, the buffer manager being independent of the independent communication layers; requesting one of the circular communication buffers from the buffer manager by one of the independent communication layers; and providing a plurality of different operations in the buffer manager to read first data from or write second data to such one of the circular communication buffers for a number of the independent communication layers.

The method may employ such one of the circular communication buffers with a first end and an opposite second end; and may write the second data as one of the different operations to one of the first end and the opposite second end of such one of the circular communication buffers.

The method may employ such one of the circular communication buffers with a first end and an opposite second end; and may read the first data as one of the different operations from one of the first end and the opposite second end of such one of the circular communication buffers.

The method may employ a communication packet in such one of the circular communication buffers; may employ as the first end a start of frame of the communication packet; may employ as the opposite second end an end of frame of the communication packet; and may write the second data after the end of frame.

The method may employ a communication packet in such one of the circular communication buffers; may employ as the first end a start of frame of the communication packet; may employ as the opposite second end an end of frame of the communication packet; and may write the second data before the start of frame.

The method may employ a communication packet in such one of the circular communication buffers; may employ as the first end a start of frame of the communication packet; may employ as the opposite second end an end of frame of the communication packet; and may destructively read the first data before the start of frame.

The method may employ a communication packet in such one of the circular communication buffers; may employ as the first end a start of frame of the communication packet; may employ as the opposite second end an end of frame of the communication packet; and may destructively read the first data after the end of frame.

The method may employ a communication packet in such one of the circular communication buffers; may employing as the first end a start of frame of the communication packet; may employ as the opposite second end an end of frame of the communication packet; and may non-destructively read the first data before the start of frame without deleting the first data from such one of the circular communication buffers.

The method may reverse such writing the second data before the start of frame.

The method may lease such one of the circular communication buffers from the buffer manager by such one of the independent communication layers; and may sublease such one of the circular communication buffers by such one of the independent communication layers to another one of the independent communication layers.

As another aspect of the invention, a node comprises: a transceiver; and a processor comprising a memory, and a communication routine, wherein the memory includes a plurality of circular communication buffers, wherein the communication routine includes a buffer manager structured to manage the circular communication buffers, a plurality of independent communication layers comprising a physical layer operatively associated with the transceiver, the buffer manager being independent of the independent communication layers, wherein a number of the independent communication layers are structured to request one of the circular communication buffers from the buffer manager by one of the independent communication layers, and wherein the buffer manager is further structured to provide a plurality of different operations to read first data from or write second data to such one of the circular communication buffers for a number of the independent communication layers.

As another aspect of the invention, a system comprises: a plurality of nodes, each of the nodes being structured to communicate with a number of others of the nodes, each of the nodes comprising: a transceiver, and a processor comprising a memory, and a communication routine, wherein the memory includes a plurality of circular communication buffers, wherein the communication routine includes a buffer manager structured to manage the circular communication buffers, a plurality of independent communication layers comprising a physical layer operatively associated with the transceiver, the buffer manager being independent of the independent communication layers, wherein a number of the independent communication layers are structured to request one of the circular communication buffers from the buffer manager by one of the independent communication layers, and wherein the buffer manager is further structured to provide a plurality of different operations to read first data from or write second data to such one of the circular communication buffers for a number of the independent communication layers.

Such one of the circular communication buffers may have a first end and an opposite second end; the buffer manager may be further structured to write the second data as one of the different operations to the opposite second end of such one of the circular communication buffers; and the buffer manager may be further structured to write the second data as another one of the different operations to the first end of such one of the circular communication buffers.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" means a programmable analog and/or digital apparatus that can store, retrieve, and process data; a computer; a workstation; a personal computer; a microprocessor; a microcontroller; a microcomputer; a central processing unit; a mainframe computer; a mini-computer; a server; a networked processor; or any suitable processing apparatus.

As employed herein, the term "wireless" shall expressly include, but not be limited by, radio frequency (RF), light, visible light, infrared, ultrasound, wireless area networks, such as, but not limited to, IEEE 802.11 and all its variants (e.g., without limitation, 802.11a; 802.11b; 802.11g), IEEE 802.15 and all its variants (e.g., without limitation, 802.15.1; 802.15.3, 802.15.4), IEEE 802.16 and all its variants, IEEE 802.22 and all its variants, other wireless communication standards (e.g., without limitation, ZigBee™ Alliance standard), HyperLan, DECT, PWT, pager, PCS, Wi-Fi, Bluetooth™, and cellular.

As employed herein, the term "wireless communication network" means a communication network employing wireless communications, such as, for example and without limitation, a mesh topology wireless communication network and/or a wireless sensor network and/or a wireless ad-hoc communication network.

As employed herein, the term "wireless sensor network" means a network comprising spatially distributed autonomous nodes using devices to control outputs and/or sensors to receive inputs that cooperatively sense, for example, physical or environmental conditions, such as for example and without limitation, light, temperature, sound, vibration, pressure, motion or pollutants, at different locations. Non-limiting examples of wireless sensor networks include a wireless facilities management system or a wireless infrastructure management system employed for environment and/or habitat monitoring, healthcare applications, home automation, commercial lighting control or traffic control. Each node in a wireless sensor network is typically equipped with transceiver (e.g., a radio transceiver or other suitable wireless communication apparatus), a processor (e.g., without limitation, small microcontroller), and an energy source, such as a battery or a mains-powered energy source.

As employed herein, the term "mains-powered" refers to any node, which has continuous power capabilities (e.g., powered from an AC outlet or AC receptacle or AC power source; AC/DC powered apparatus; rechargeable battery powered apparatus; other rechargeable apparatus), but excluding non-rechargeable battery powered apparatus.

As employed herein, the term "network coordinator" (NC) means any communicating node, which operates as the central controller in a communication network.

As employed herein, the term "network device" (ND) means any communicating device (e.g., without limitation, a ballast; a portable wireless communicating device; a fob; a camera/sensor device; a wireless camera; a control device; and/or a fixed wireless communicating device, such as, for example, switch sensors, motion sensors or temperature sensors as employed in a wirelessly enabled sensor network), which participates in a communication network, and which is not a network coordinator.

As employed herein, the term "node" means NDs, NCs, as well as any processing, logging and/or communicating apparatus (e.g., without limitation, a portable communicating apparatus; a fixed communicating apparatus, such as, for example, switches, motion sensors or temperature sensors as employed in a wireless sensor network), which participates in a communication network.

As employed herein, the term "sensor" means an apparatus structured to input data or information and to output related data or information to a communication network. A sensor may optionally include or be operatively associated with zero or a number of devices. Non-limiting examples of sensors include sensors structured to sense light, switch sensors, pushbutton sensors, motion sensors, temperature sensors, sound sensors, vibration sensors, pollution sensors, current sensors and/or voltage sensors.

As employed herein, the term "device" means an apparatus structured to input data, information or a control command from a communication network and to output corresponding data, corresponding information or a corresponding control action. A device may optionally include or be operatively associated with zero or a number of sensors. Non-limiting examples of devices include ballasts, lights, power relays, water valves, data collection and/or network bridges.

As employed herein, the term "server" means a base station or other suitable processor, which operates as the central controller in a communication network.

As employed herein, the term "wireless system" means a wireless communication network including, for example, a server and a number of sensors or devices, which communicate, for example, using wireless communications.

As employed herein, the term "application framework" means an active object-based framework (e.g., without limitation, "Quantum Framework"); a real time event driven state machine based application framework for embedded systems; an interrupt driven framework; an object exchange framework; a layer support framework; and/or other suitable frameworks providing asynchronous communications among a buffer manager and a plurality of independent communication layers.

For convenience of disclosure, the following acronyms are employed herein:

APP: application layer

APS: application support layer

NWK: network layer

MAC: medium access control sub-layer

PHY: physical layer

The invention is described in association with a wireless node, although the invention is applicable to a wide range of communicating apparatus.

Figure 1:
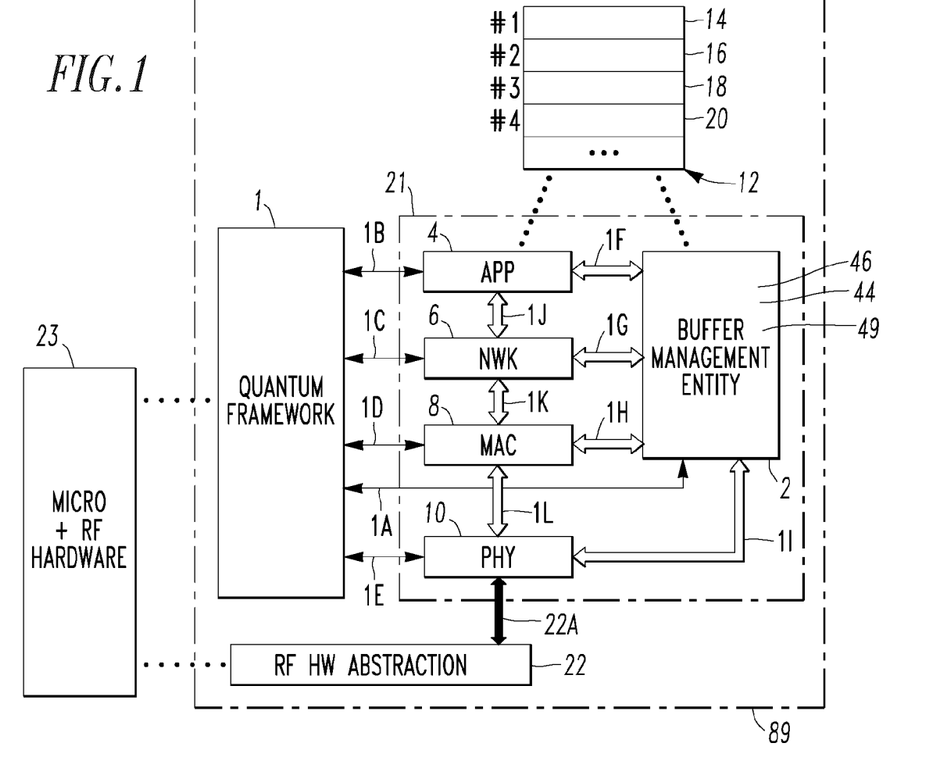
FIG. 1 is a block diagram of a buffer management entity (BME) and an application framework, such as Quantum Framework (QF), in accordance with embodiments of the invention.

Referring to FIG. 1, high level interaction is shown between a suitable application framework, such as, for example and without limitation, Quantum Framework (QF) 1, a buffer management entity (BME) 2 and a plurality of communication layers, such as a number of application (APP) layers 4 (only one example APP layer 4 is shown, although two or more such layers may be employed), the network (NWK) layer 6, the MAC sub-layer 8 (hereinafter referred to as "MAC layer 8") (e.g., which MAC sub-layer 8 may be all or part of a data link layer (not shown)), and the physical (PHY) layer 10. The BME 2 functions as a buffer manager for a plurality of communication buffers 12 and is independent of the communication layers 4, 6, 8, 10. As will be explained, the layers 4, 6, 8, 10 request one or more of the communication buffers 12 from the BME 2 and release those requested buffers back to the BME after they are "consumed" (e.g., for a TX buffer, the message has been fully transmitted; for an RX buffer, the message has been considered by all layers and is no longer needed by the APP layer 4; a buffer no longer serves a useful purpose).

Although example communication layers 4, 6, 8, 10 are shown, fewer layers or one or more additional layer(s) may be employed. Also, an APS (not shown) may be included as a separate layer (e.g., between layers 4 and 6) or as part of the APP layer 4.

The BME 2, therefore, provides a mechanism for managing the communication buffers 12 for the communication layers 4, 6, 8, 10. Briefly, the management mechanism includes: (1) requesting by one of the communication layers 4, 6, 8, 10 one of the communication buffers 12 from the BME 2; (2) responsive to this requesting, receiving at the requesting one of the communication layers 4, 6, 8, 10 an identification of the requested one of the communication buffers 12 from the BME 2; (3) employing (e.g. for transmitting or receiving a message frame) the requested one of the communication buffers 12 at one of the communication layers 4, 6, 8, 10; and (4) releasing by one of the communication layers 4, 6, 8, 10 the requested one of the communication buffers 12 to the BME 2 or indicating by one of the communication layers 4, 6, 8, 10 the requested one of the communication buffers 12 to another one of the communication layers 4, 6, 8, 10.

The BME 2 employs at least enough memory for the communication buffers 12 to store two message frames (e.g., one transmit buffer 14 and one receive buffer 16) of the largest possible size as defined by the communication protocol that employs the BME management mechanism. However, in order to accommodate incoming and outgoing messages without losing any of them, the BME 2 preferably has at least four buffers 14, 16, 18, 20. Each of the buffers 14, 16, 18, 20 can become a transmit buffer or a receive buffer depending on the needs imposed by the message traffic, although certain rules may apply. If, for example, the BME 2 has four buffers, then there is preferably one transmit buffer, one receive buffer, one dedicated MAC buffer, and a "spare" buffer.

Each of the layers, such as 4, 6, 8 (e.g., typically the MAC layer 8 and higher) and the PHY layer 10 (which PHY layer 10 can send messages to a neighboring communicating apparatus (not shown)), can request one of the communication buffers 12 for creating a message frame.

The independent BME 2 and the independent layers 4, 6, 8, 10 form a communication network protocol stack (or communication protocol stack) 21 to provide network communication with a plurality of different corresponding services. The QF 1 provides asynchronous communications on interfaces 1A and 1B, 1C, 1D, 1E among the BME 2 and the independent communication layers 4, 6, 8, 10, respectively. In turn, the QF 1 provides asynchronous logical communications on logical interfaces 1F, 1G, 1H, 1I, 1J, 1K, 1L.

FIG. 1 also shows a radio frequency (RF) hardware (HW) abstraction 22 and a microprocessor and RF hardware circuit 23. The RF HW abstraction 22 communicates with the PHY layer 10 through a suitable synchronous interface 22A and with the circuit 23 through a suitable interface (not shown). The circuit 23 communicates with the QF 1 through a suitable interface (not shown).

Figure 2A:
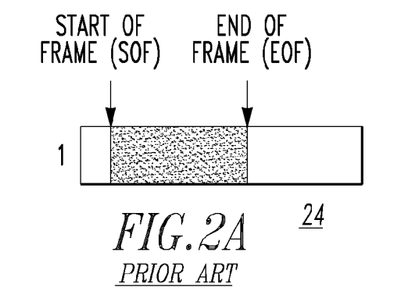
FIG. 2A is a block diagram of a communication packet.
Figure 2B:
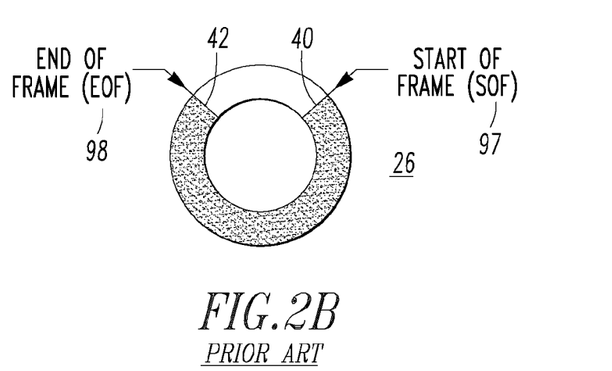
FIG. 2B is a block diagram of a circular communication buffer for a packet.

As part of the communication buffers 12, circular buffers are employed in the event that there are no (or insufficient) bytes to the left or right of a packet. As shown in FIGS. 2A-2B, the uncertainty of the number of bytes a layer can add to the left or right (with respect to FIG. 2A) of a communication packet 24 (FIG. 2A) is preferably addressed by the circular communication buffer (or circular buffer) 26 (FIG. 2B).

For the data transmission goal of the communication protocol stack 21 (FIG. 1), the upper layers originate the packet buffer. Frequently, the topmost APP layer 4 originates the packet, although the NWK layer 6 or the MAC layer 8 can also originate the packet. Each lower layer adds a layer specific header or payload data to this buffer before the packet is transmitted (e.g., by the radio over the wireless medium).

Figure 3:
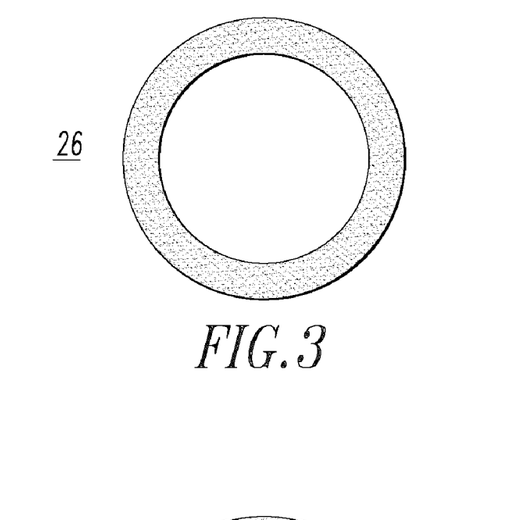
FIGS. 3-9 are block diagrams of the circular communication buffer of FIG. 2B in various stages of a packet transmission operation.

For the data reception goal, the bottommost layer (PHY layer 10) receives the packet (e.g., from the radio, which receives it from the wireless medium). Each layer extracts the data relevant to that layer, processes the data, and then transfers the ownership of the packet buffer to the next upper layer. The last layer that can possibly receive the ownership of this buffer is topmost APP layer 4. This layer processes the relevant information and then returns (e.g., releases its "lease") the circular buffer 26 to the BME 2 (FIGS. 2B and 3).

Example 1

Packet transmission proceeds as set forth in Table 1:

TABLE 1

Figure 4:
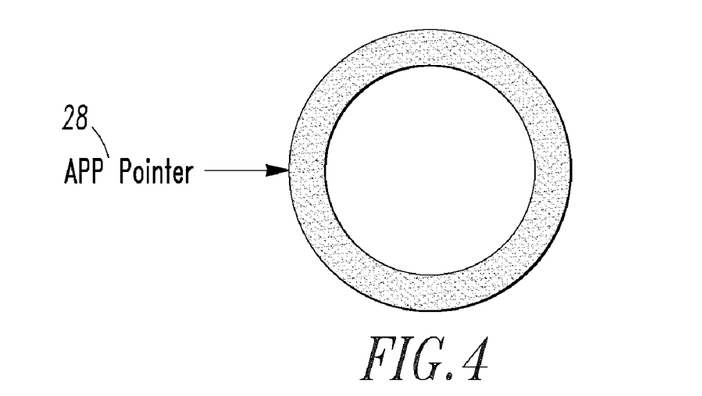
Figure 5:
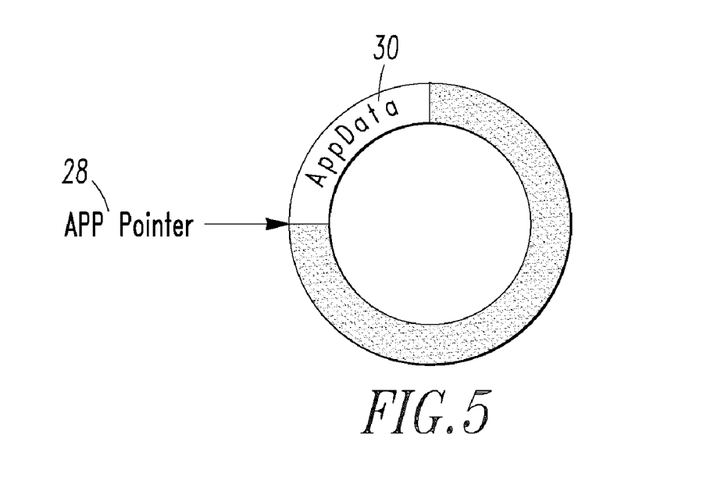
Figure 11A:
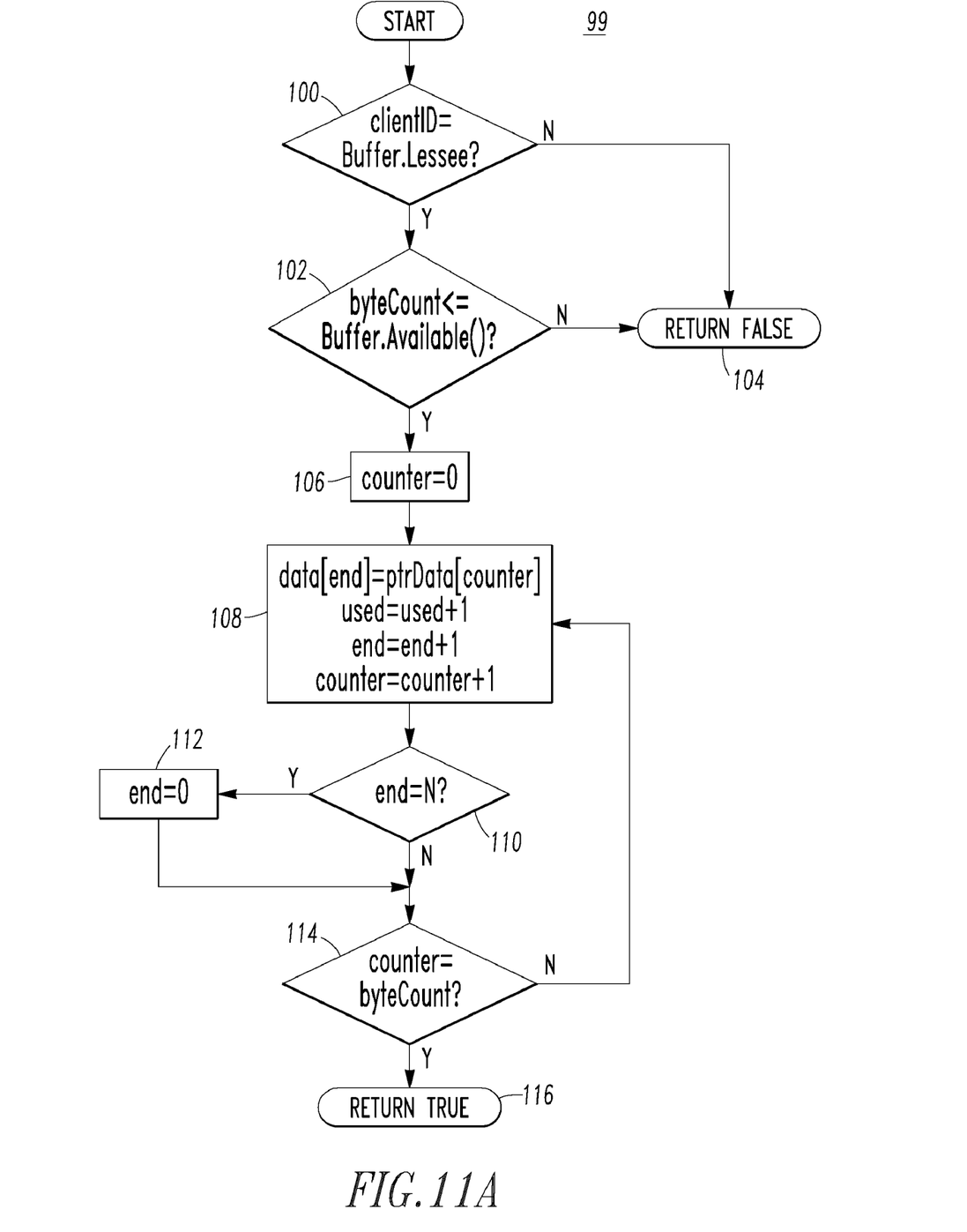
FIGS. 11A-11E are flowcharts of various primitive operations of the BME of FIG. 1.

| Step | Layer | Task | Buffer Owner |
|---|---|---|---|
| 1 | APP | The APP layer 4 requests a new transmit buffer from the BME 2 by sending a Buffer Request message (using Request operation 46) to the BME 2 to specify the number of bytes to send. The BME 2 checks if a buffer is available and may also check if there is at least one receive buffer available. | BME |
| 2 | BME | The BME 2 grants the request and then returns the buffer number. The BME 2 ensures that sufficient space for the MAC and NWK headers and footers is available. Finally, the BME 2 sets the APP layer 4 as both the owner and releaser (i.e., the release layer) of the buffer. Here, unlike the BME of U.S. Patent Application Publication No. 2006/0080455, there is no need to give the pointer information 28 (FIG. 4) to the APP layer 4. | APP |
| 3 | APP | The APP layer 4 fills the assigned buffer space with its data (APPData) 30 (FIG. 5) and issues a NK_DATA.request primitive to the NWK layer 6 indicating the buffer number handing off | APP |

TABLE 1-continued

Figure 6:
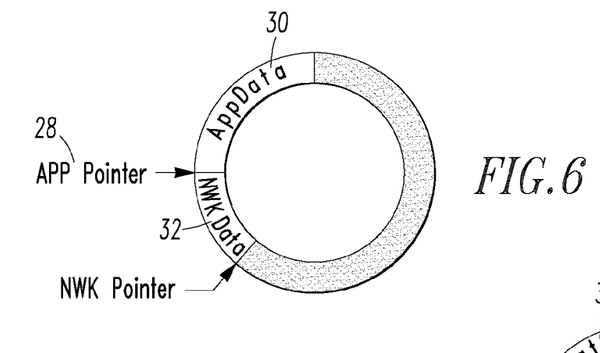
Figure 7:
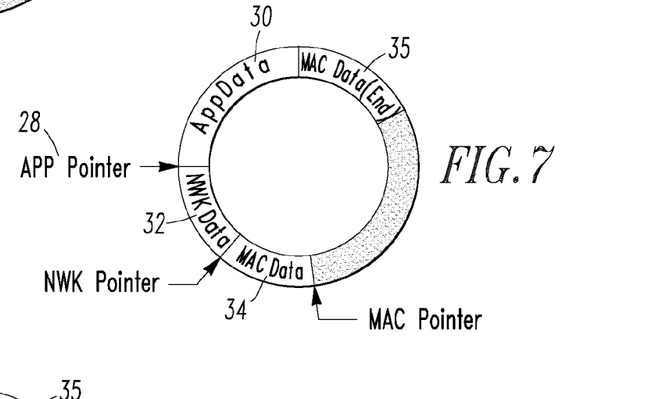
Figure 8:
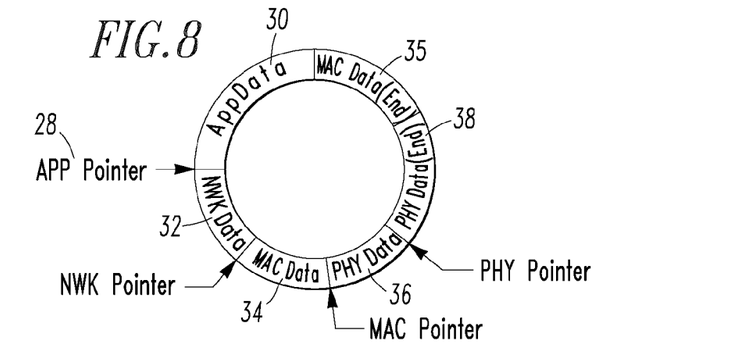
Figure 9:
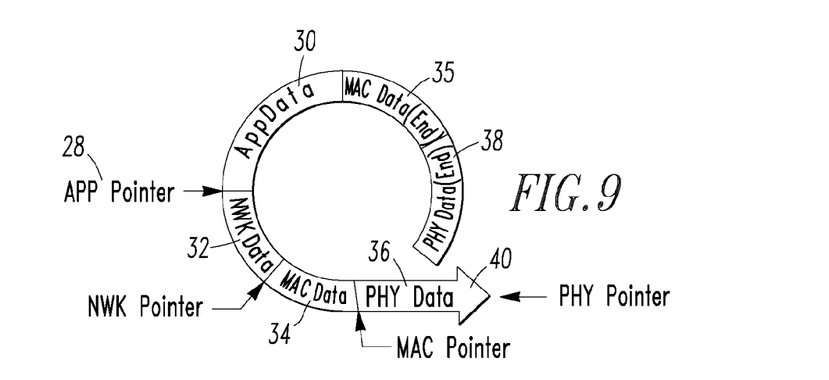

| Step | Layer | Task | Buffer Owner |
|---|---|---|---|
|   |   | the control of the buffer to the NWK layer 6. The APP layer 4 can use the Append operation 99 (FIG. 11A) to add data into the buffer. |   |
| 4 | NWK | The NWK layer 6 requests to add its header and footer to the message in the buffer by sending a Buffer Request message to the BME 2. The NWK layer 6 fills the assigned buffer space with its header and footer information. After the NWK header is written to the buffer, the NWK layer 6 issues a MCPS_DATA.request primitive to the MAC layer 8 indicating the buffer number of the buffer that hands off control of the buffer to the MAC layer 8. Here, the Prepend operation 119 (FIG. 11B) allows a layer to add bytes to a buffer as a header (NWK Data) 32 (FIG. 6). | NWK |
| 5 | MAC | The MAC layer 8 adds its headers 34 (MAC Data) (FIG. 7) and trailers 35 (MAC Data (End)) to the buffer, and notifies the PHY layer 10 that the packet is ready for transmission. Here, one or both of the Append and Prepend operations 99,119 may be employed. | MAC |
| 6 | PHY | The PHY layer 10 adds its headers (PHY Data) 36 (FIG. 8) and trailers (PHY Data (End)) 38 (FIG. 8) to the buffer. Here, one or both of the Append and Prepend operations 99,119 may be employed. | PHY |
| 7 | PHY | The PHY layer 10 transmits the packet, starting from the head 40 of the buffer to the end 42. Here, the ReadLeft operation 139 (FIG. 11C) may be employed. | PHY |

The circular buffer 26 (FIGS. 2B and 3) is implemented as an object with the following attributes:

Data an array of N elements (e.g., without limitation, 127 elements for IEEE 802.15.4), in which the data frames to be sent and received are stored in this attribute;

Used an integer counter employed to keep the count of bytes used in the Data array and used by the various BME algorithms 44 (FIGS. 1 and 11A-11E);

Begin an integer reference to the location in Data associated to the start of a frame;

End an integer reference to the location in Data associated to the end of a frame; and Lessee an integer Layer, which temporarily owns the circular buffer 26, by using the Request operation 46 of Patent Application Publication No. 2006/0080455, which is incorporated by reference herein.

The circular buffer 26 has the following operations:

Available( ): returns an integer count of bytes available in the array Data for usage (e.g., the operation "N−used", which is "N" minus the number of bytes occupied ("used")).

The BME algorithms 44 (primitive operations 99 of FIG. 11A, 119 of FIG. 11B, 139 of FIG. 11C, 179 of FIG. 11D, and 199 of FIG. 11E) are now described. In the stack 21 (FIG. 1), each buffer client (i.e., a protocol stack layer, such as 4, 6, 8, 10) can add its data content to either end of the existing data content of a specified buffer. Append and Prepend are the primitive names used for these operations, respectively.

Similarly, ReadLeft reads data from the left (SOF) end 40 (FIG. 2B) destructively. In other words, after reading the data, the data is no longer available for use in the circular buffer 26. This is achieved merely by shifting either the left boundary of the circular buffer 26.

Peek is the primitive that reads non-destructively. In other words, by using Peek, a layer can read the data from left to right without deleting data from the circular buffer 26. In this context, deletion of data means only shifting the left or right boundary of the circular buffer 26. Peek is used for a communication layer (e.g., NWK layer 6) to read the contents of the circular buffer 26 without extracting information. This is useful for rerouting packets to another node without destroying the data.

The Unroll primitive is used if there is a need to reverse previous writing operations (e.g., Append; Prepend).

Finally, when there is no longer any usage of the circular buffer 26, the Release primitive 49 of Patent Application Publication No. 2006/0080455 is used to return the circular buffer 26 to the BME 2.

Figure 10A:
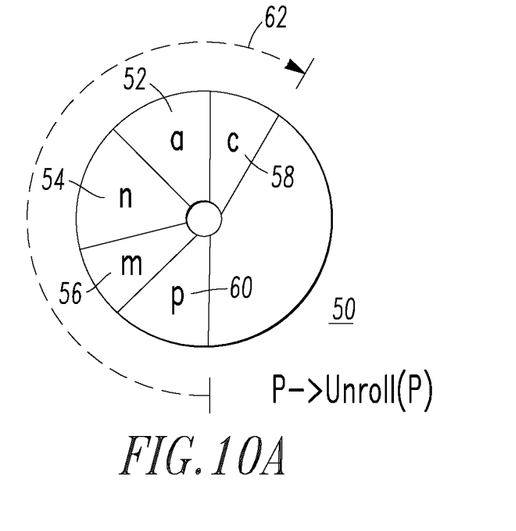
FIGS. 10A-10E show the usage of various primitive operations by the BME of FIG. 1.

FIGS. 10A-10E show the usage of each of the above primitive operations, except for Peek and ReadLeft. FIG. 10A shows a completely formed circular buffer 50 ready to be transmitted. At this point of time, the PHY layer 10 owns the circular buffer 50, since that layer is responsible for the final stage of transmission. Various writing actions have taken place for this circular buffer 50 in which a corresponding layer performed the specific writing action. For example, the APP layer 4 obtained the buffer 50 to begin with and has done a Prepend write operation to add its data element a 52. Then, the NWK layer 6 has done a Prepend write operation to add its data element n 54 and so on. The MAC layer 8 has done a Prepend operation and then an Append operation. The first Prepend operation adds the MAC data element m 56 to the circular buffer 50. The later Append operation adds the CRC bytes c 58 to the right (End of Frame) end of the buffer 50. The PHY layer 10 performs a Prepend operation to add data element p 60. Finally, the PHY layer 10 transmits the circular buffer contents starting from the SOF-most byte to the EOF-most byte as shown by the dotted line 62 in the clockwise direction.

Figure 10B:
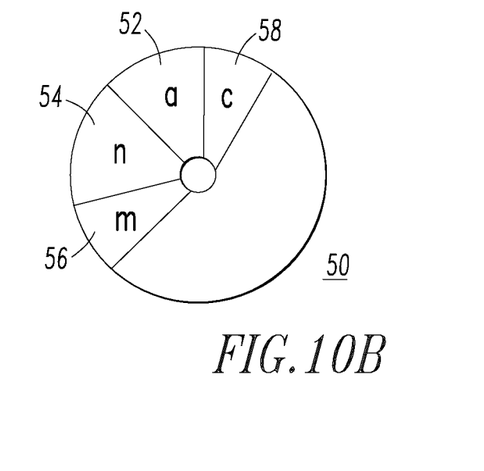
Figure 10C:
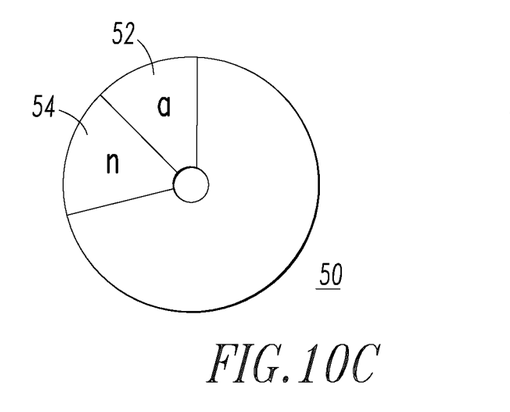

In the event that the transmission attempt fails, then as shown in FIG. 10B, the PHY layer 10 employs the Unroll operation to unroll its earlier written content p 60 in the buffer 50 and, then, passes the ownership back to the MAC layer 8.

Figure 10D:
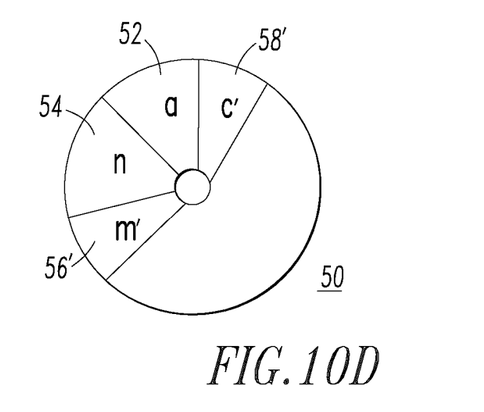

The MAC layer 8 first does an Unroll operation to reverse both of its earlier write actions (i.e., in this example, the Prepend of m 56 and the Append of c 58). This results in the buffer configuration in FIG. 10C. Then, the MAC layer 8 reconstructs its data element (e.g., possibly changing the destination address or some other parameter) and does a Prepend operation, again, writing the new data element m' 56' (FIG. 10D). Once again, the MAC layer 8 computes the new CRC c' 58' and writes it using the Append operation. Then, the MAC layer 8 transfers ownership of the buffer 50 back to the PHY layer 10, which results in the configuration of the buffer 50 of FIG. 10D.

Figure 10E:
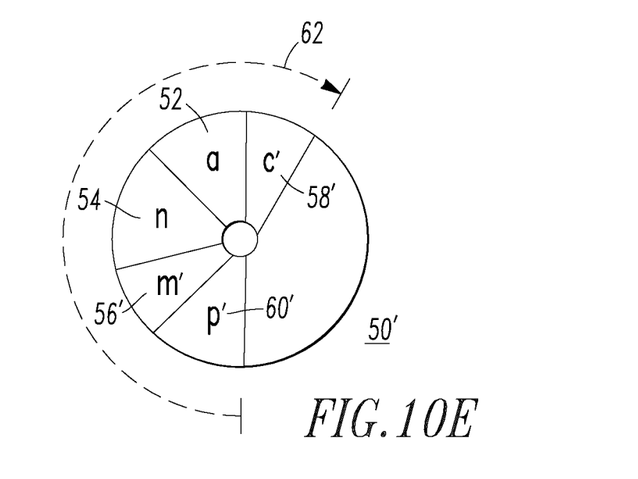

The PHY layer 10, then, performs the Prepend operation with its new data element p' 60' and transmits the buffer 50 following the direction depicted by the dotted line 62 as in FIG. 10E.

The Append operation 99 of FIG. 11A adds bytes "after" the End of Frame (EOF) 98 (FIG. 2B). This operation 99 inputs clientId (the identifier of the layer attempting to add bytes), ptrData (the pointer to the data to be added), byteCount (the number of bytes to be added) and Buffer (a circular buffer object), and outputs a logical true if the operation 99 was successful. After starting, at 100, it is determined if clientID is equal to Buffer.Lessee. If so, then at 102, it is determined if byteCount is less than or equal to Buffer.Available( ). If not at either 100 or 102, then the operation 99 returns a logical false at 104. On the other hand, if the number of bytes to be added is within the size of Buffer.Available( ), then at 106, a temporal variable counter is set equal to zero. Next, at 108, the content is transferred from ptrData to Data and the used bytes are tracked. Here, data[end] is set equal to ptrData[counter] and used, end and counter are incremented. Then, at 110, it is determined if end is equal to N (e.g., without limitation, N=127, which is the maximum number of bytes). If so, then at 112 buffer rollover is accounted for by setting end equal to zero. Otherwise, or after 112, at 114, it is determined if counter is equal to byteCount. If not, then step 108 is repeated. Otherwise, at 116, the operation 99 outputs a logical true since it was successful.

Figure 11B:
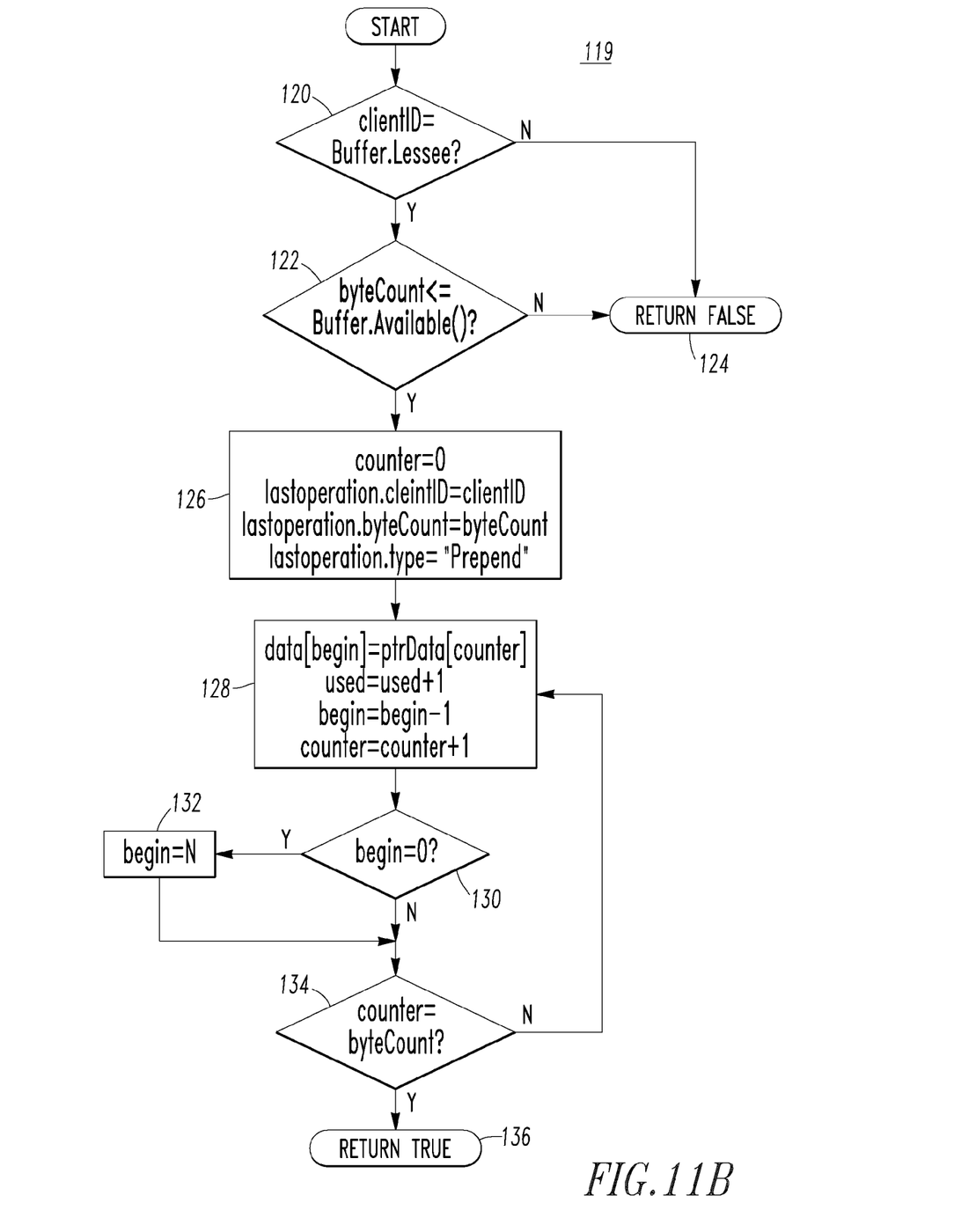

The Prepend operation 119 of FIG. 11B adds bytes "before" the Start of Frame (SOF) 97 (FIG. 2B). This operation 119 inputs clientId (the identifier of the Layer attempting to add bytes), ptrData (the pointer to the data to be added), byteCount (the number of bytes to be added) and Buffer (a circular buffer object), and outputs a logical true if the operation 119 was successful. After starting, at 120, it is determined if clientID is equal to Buffer.Lessee. If so, then at 122, it is determined if byteCount is less than or equal to Buffer.Available( ). If not at either 120 or 122, then the operation 119 returns a logical false at 124. On the other hand, if the number of bytes to be added is within the size of Buffer.Available( ), then at 126, a temporal variable counter is set equal to zero. Also, this operation 119 is stored for the Unroll operation 199 (FIG. 11E) by setting lastoperation.clientID equal to clientID, lastoperation.byteCount equal to byteCount and lastoperation.type equal to "Prepend". Next, at 128, the content is transferred from ptrData to Data and the used bytes are tracked. Here, data[begin] is set equal to ptrData[counter], used and counter are incremented, and begin is decremented. Then, at 130, it is determined if begin is equal to 0. If so, then at 132 buffer rollover is accounted for by setting begin equal to N. Otherwise, or after 132, at 134, it is determined if counter is equal to byteCount. If not, then step 128 is repeated. Otherwise, at 136, the operation 119 outputs a logical true since it was successful.

Figure 11C:
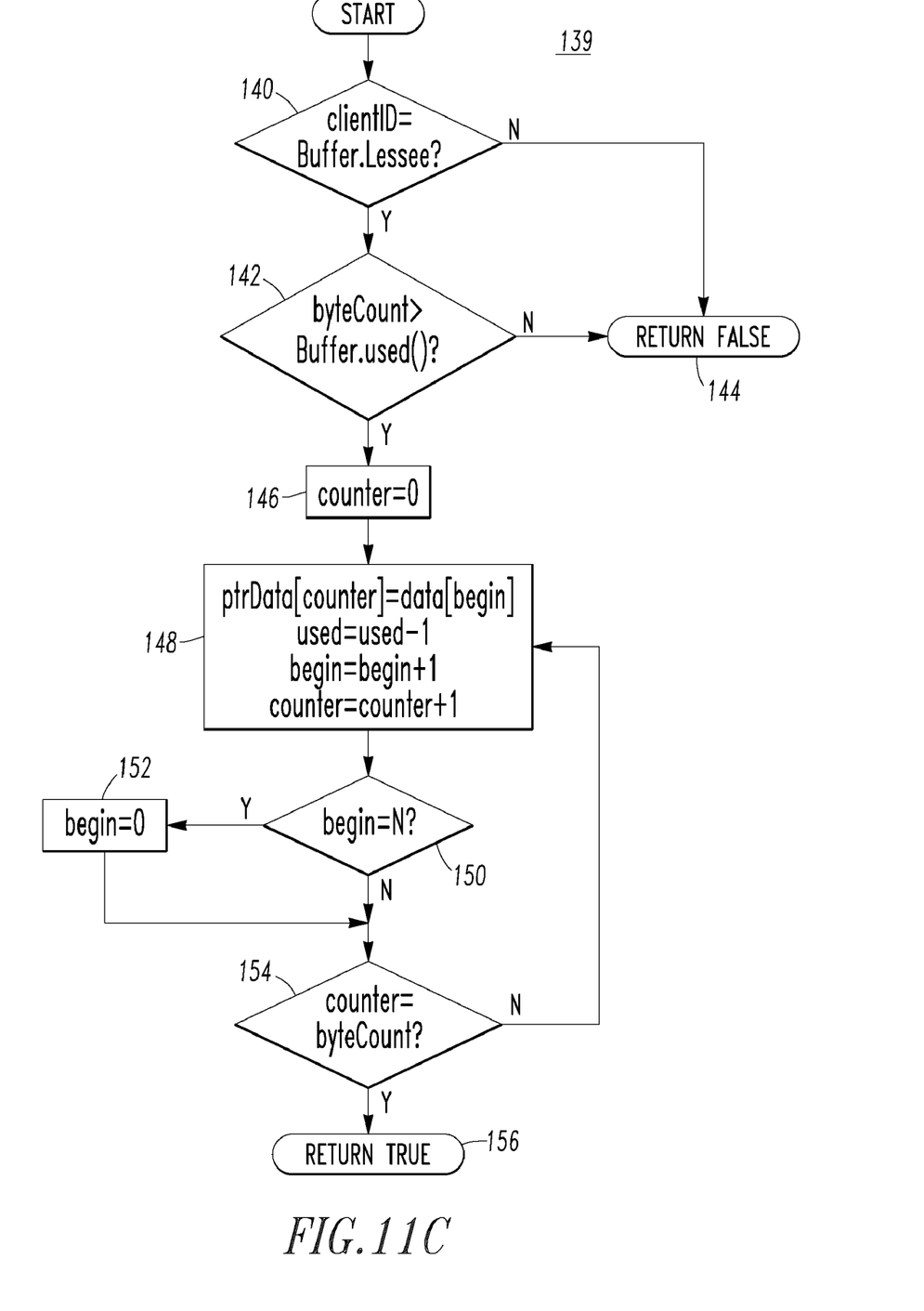
Figure 11D:
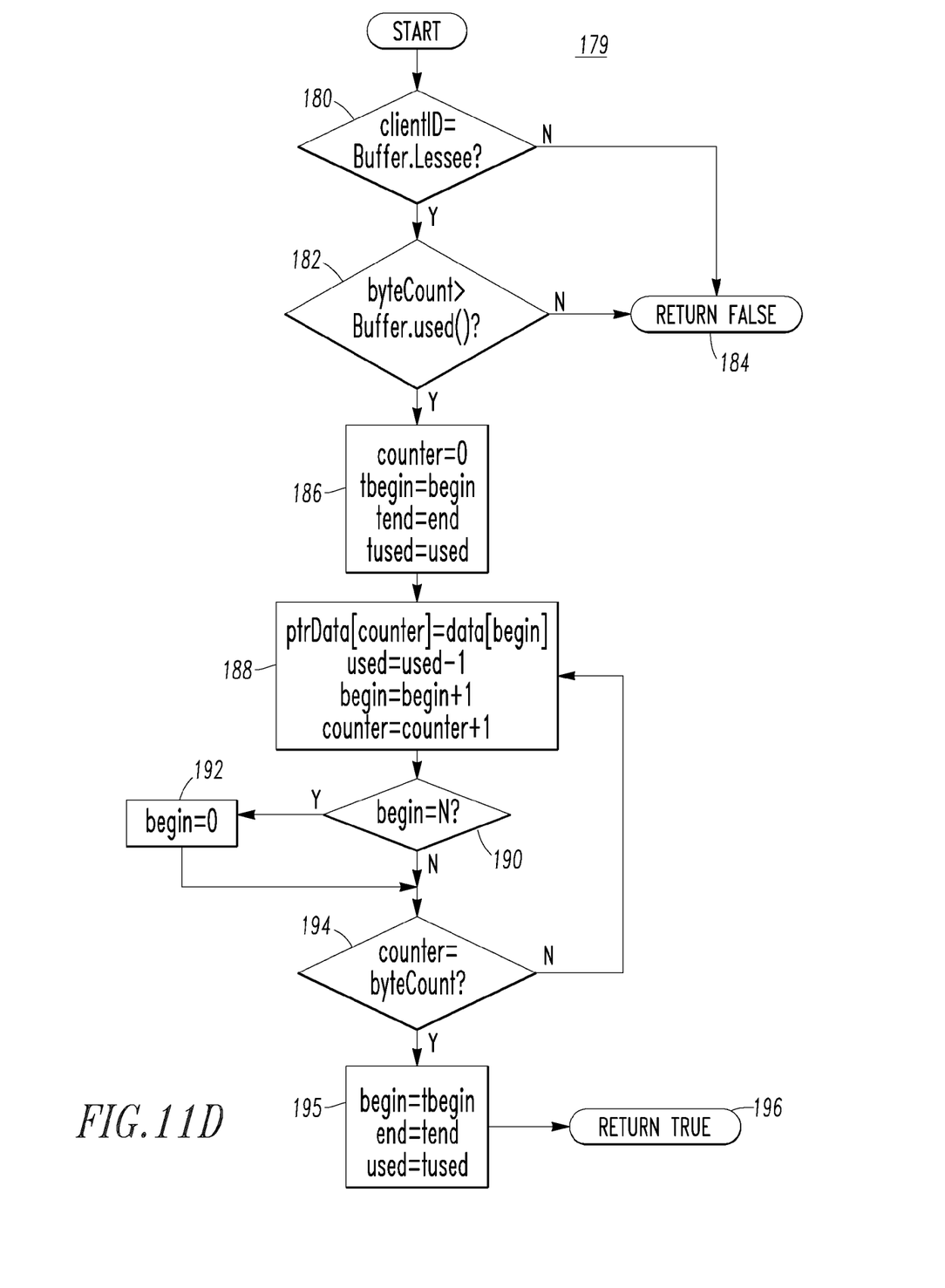

The ReadLeft operation 139 of FIG. 11D removes bytes "before" the Start of Frame (SOF) 97 (FIG. 2B). This operation 139 inputs clientId (the identifier of the layer attempting to read bytes), byteCount (the number of bytes to be read), ptrData (the pointer to the data space where read bytes are going to be stored) and Buffer (a circular buffer object), and outputs a logical true if the operation 139 was successful. After starting, at 140, it is determined if clientID is equal to Buffer.Lessee. If so, then at 142, it is determined if byteCount is greater than Buffer.Available( ). If not at either 140 or 142, then the operation 139 returns a logical false at 144. On the other hand, if the number of bytes to be read is greater than the size of Buffer.used( ), then at 146, a temporal variable counter is set equal to zero. Next, at 148, the content is transferred from Data to ptrData and the used bytes are tracked. Here, ptrData[counter] is set equal to data[begin], used is decremented, and begin and counter are incremented. Then, at 150, it is determined if begin is equal to N. If so, then at 152 buffer rollover is accounted for by setting begin equal to zero. Otherwise, or after 152, at 154, it is determined if counter is equal to byteCount. If not, then step 148 is repeated. Otherwise, at 156, the operation 139 outputs a logical true since it was successful.

The Peek operation 179 of FIG. 11D reads bytes "before" the Start of Frame (SOF) 97 of FIG. 2B, without removing them from the circular buffer 26. This operation 179 inputs clientId (the identifier of the layer attempting to read bytes), byteCount (the number of bytes to be read), ptrData (the pointer to the data space where read bytes are going to be stored) and Buffer (a circular buffer object), and outputs a logical true if the operation 179 was successful. After starting, at 180, it is determined if clientID is equal to Buffer.Lessee. If so, then at 182, it is determined if byteCount is greater than Buffer.Available( ). If not at either 180 or 182, then the operation 179 returns a logical false at 184. On the other hand, if the number of bytes to be read is greater than the size of Buffer.used( ), then at 186, a temporal variable counter is set equal to zero. Also, the buffer state is stored by setting tbegin equal to begin, tend equal to end, and tused equal to used. Next, at 188, the content is transferred from Data to ptrData and the used bytes are tracked. Here, ptrData[counter] is set equal to data[begin], used is decremented, and begin and counter are incremented. Then, at 190, it is determined if begin is equal to N. If so, then at 192 buffer rollover is accounted for by setting begin equal to zero. Otherwise, or after 192, at 194, it is determined if counter is equal to byteCount. If not, then step 188 is repeated. Otherwise, at 195, the buffer state is restored by setting begin equal to tbegin, end equal to tend, and used equal to tused. Finally, at 196, the operation 179 outputs a logical true since it was successful.

Figure 11E:
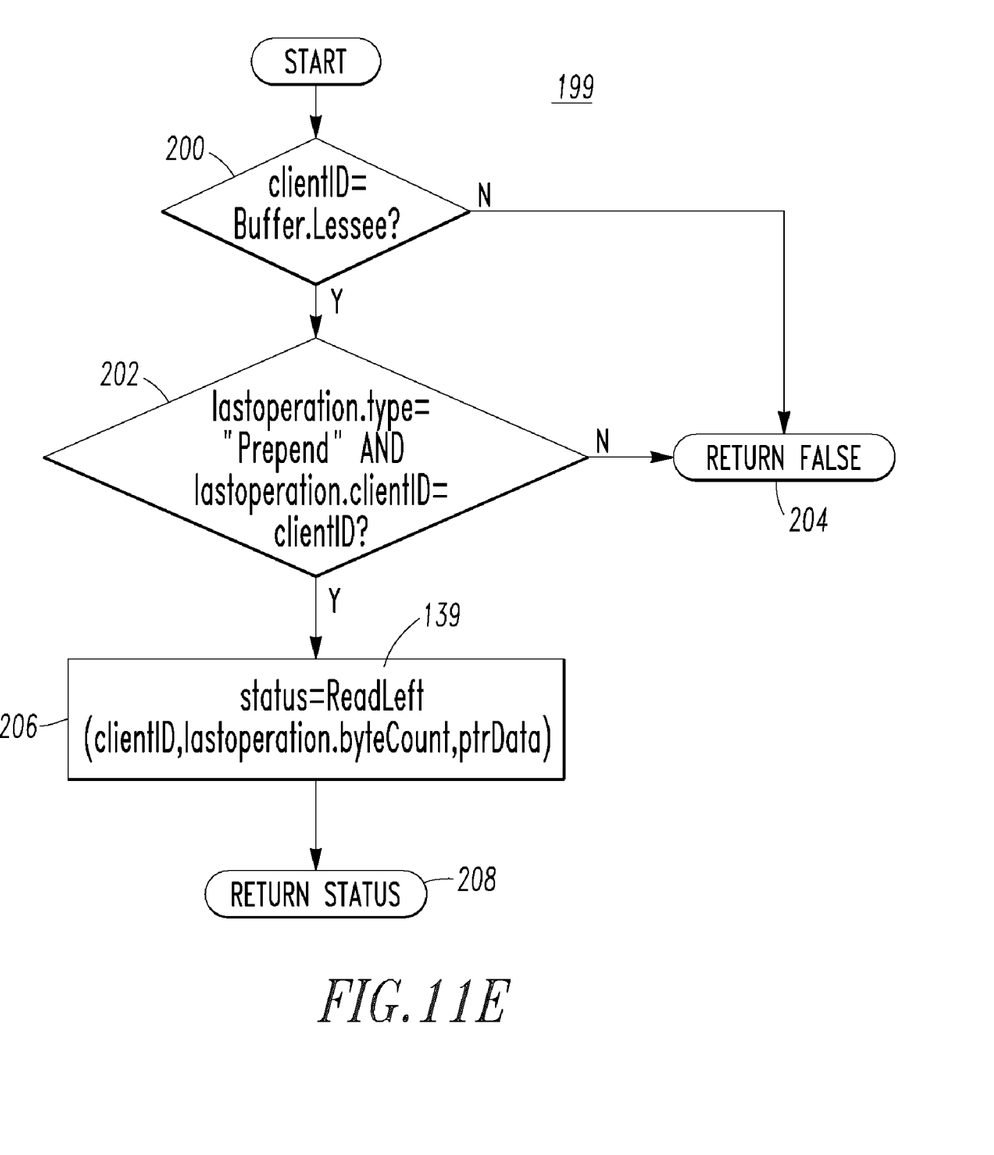

The Unroll operation 199 of FIG. 11E is employed to undo the last operation performed to the circular buffer 26 by a particular client. This operation 199 inputs clientId (the identifier of the layer attempting to undo the write operation) and Buffer (a circular buffer object), and outputs a logical true if the operation 199 was successful. After starting, at 200, it is determined if clientID is equal to Buffer.Lessee. If so, then at 202, it is determined if lastoperation.type is equal to "Prepend" and if lastoperation.clientID is equal to clientID. If not at either 200 or 202, then the operation 199 returns a logical false at 204. Otherwise, at 206, a ReadLeft operation 139 (FIG. 11C) is performed to undo the buffer operation.

Finally, at 208, the status is returned from the ReadLeft operation 139, which is a logical true if it was successful or logical false if it was unsuccessful. Although the Unroll operation 199 has been disclosed in connection with undoing the Prepend operation 119, it will be appreciated that it may be readily modified to support the Append operation 99 either with or without the Prepend operation.

Figure 12:
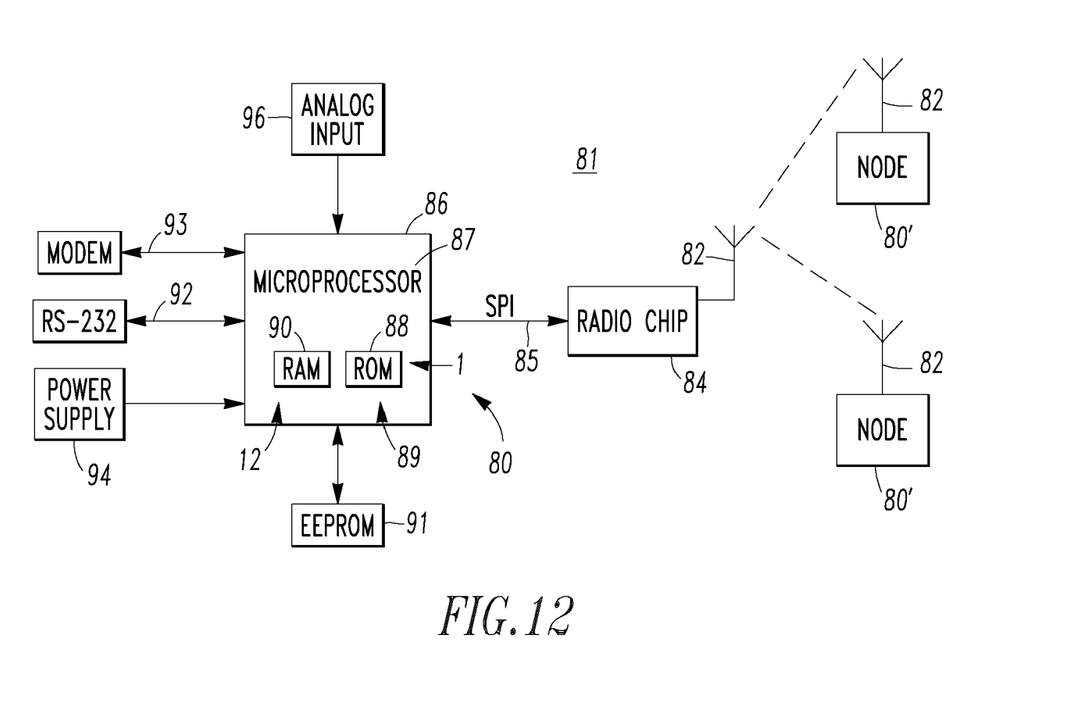
FIG. 12 is a block diagram of a system including network devices having the BME of FIG. 1.

FIG. 12 is a block diagram of a node, such as LR-WPAN node 80, including an antenna port 82, a wireless (e.g., radio frequency (RF)) front-end transceiver 84, a serial peripheral interface (SPI) 85, a processor, such as a micro-controller core 86, having ROM 88 and RAM 90, an external EEPROM 91, a programming port 92 (e.g., without limitation, RS-232), a modem port 93, a power supply 94 and a suitable sensor interface, such as an analog input 96. An 8-bit microprocessor 87 of the core 86 executes code including the QF 1 and a communication routine 89 having the protocol stack 21 of FIG. 1. In this example, the buffers 12 of FIG. 1 are internal to the microprocessor 87, although they may be part of any suitable processor's internal or external memory. The PHY layer 10 of the protocol stack 21 of FIG. 1 is associated with the transceiver 84 through the SPI 85.

The communication routine 89 subscribes to a plurality of events by the BME 2 and the independent communication layers 4, 6, 8, 10 through the QF 1 of FIG. 1 and publishes a plurality of corresponding events by the BME 2 and by the independent communication layers 4, 6, 8, 10 through the QF 1.

A system 81 includes a plurality of nodes, such as the example wireless nodes 80,80'. The nodes 80' preferably have the same or similar structure as the node 80. As shown with the node 80, each of the example wireless nodes 80,80' is structured to wirelessly communicate with a number of others of the wireless nodes, such as 80'. Alternatively, non-wireless (wired) nodes may be employed.

The disclosed BME 2 provides an efficient approach for recovering from multi-hop transmission errors of packets in communication systems, an efficient support for multicasting packets without having to recreate the circular buffers 26 from scratch in communication systems, eliminates the need for prior knowledge of clients and the information content they store in memory, and communication system oriented operations for clients, which are not typically found in traditional memory managers to relieve clients from managing these operations. This can be used for buffer management functionalities for resource constraint communication and embedded systems.

This approach uses a pool of memory segments called circular buffers 26. Upon request (Request operation 46) by clients, the BME 2 provides a handle of a buffer (key) to the client if it is available. In other words, the buffer is leased to the requesting client. The BME 2 does not know any internal information about the client. The only information the client provides to the BME 2 is a unique identification of itself. After obtaining the key, the clients can perform high-level operations, such as Append, Prepend, reading (from any direction and at any location in the buffer; ReadLeft), transaction rollback (Unroll) and releasing (Release operation 49) the circular buffer 26. In this approach, a client can request that the BME 2 allow the sublease of the circular buffer 26 to another client. The subleased client, contrary to the leased client, does not get the right to release the circular buffer 26. The leased client can also allow the transfer of the lease to another client if it needs to do so. By using this approach of leasing and subleasing, the clients in a typical communication environment can easily and efficiently pass information from and to other clients.

By offering these high level operations, the BME 2 relieves the clients from undue processing and housekeeping required to perform commonly used communication tasks. More importantly, the BME guarantees the memory safety of such operations.

The Unroll operation is critical to help clients recover from impending errors efficiently. By using this mechanism, a client can revert the circular buffer 26 to its last known state from the BME 2. With this, it can quickly retransmit or reroute packets as part of error recovery. The Unroll operation 199 also provides the client a flexible way to multicast the same packet without having to completely reconstruct it. This improves system performance.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of network communication, said method comprising:
   employing a communication network protocol stack comprising a plurality of independent communication layers providing a plurality of different corresponding services;
   employing a plurality of circular communication buffers;
   employing a buffer manager for said circular communication buffers, said buffer manager being independent of said independent communication layers;
   requesting one of said circular communication buffers from said buffer manager by one of said independent communication layers;
   providing a plurality of different operations in said buffer manager;
   said buffer manager reading first data from or writing second data to said one of said circular communication buffers for a number of said independent communication layers; and
   executing said buffer manager by a processor.

2. The method of claim 1 further comprising employing said one of said circular communication buffers with a first end and an opposite second end; and writing said second data as one of said different operations to one of the first end and the opposite second end of said one of said circular communication buffers.

3. The method of claim 1 further comprising employing said one of said circular communication buffers with a first end and an opposite second end; and reading said first data as one of said different operations from one of the first end and the opposite second end of said one of said circular communication buffers.

4. The method of claim 2 further comprising employing a communication packet in said one of said circular communication buffers; employing as said first end a start of frame of said communication packet; employing as said opposite second end an end of frame of said communication packet; and writing said second data after said end of frame.

5. The method of claim 4 further comprising inputting an identifier of one of said number of said independent communication layers; inputting a pointer to said second data; inputting a number corresponding to the size of said second data; inputting an identifier corresponding to said one of said circular communication buffers; and outputting a status from said buffer manager of said one of said different operations.

6. The method of claim 2 further comprising employing a communication packet in said one of said circular communication buffers; employing as said first end a start of frame of said communication packet; employing as said opposite second end an end of frame of said communication packet; and writing said second data before said start of frame.

7. The method of claim 6 further comprising inputting an identifier of one of said number of said independent communication layers; inputting a pointer to said second data; inputting a number corresponding to the size of said second data; inputting an object corresponding to said one of said circular communication buffers; and outputting a status from said buffer manager of said one of said different operations.

8. The method of claim 3 further comprising employing a communication packet in said one of said circular communication buffers; employing as said first end a start of frame of said communication packet; employing as said opposite second end an end of frame of said communication packet; and said buffer manager destructively reading said first data before said start of frame.

9. The method of claim 8 further comprising inputting an identifier of one of said number of said independent communication layers; inputting a number corresponding to the size of said first data; inputting a pointer corresponding to a data space where said first data is to be stored; inputting an object corresponding to said one of said circular communication buffers; and outputting a status from said buffer manager of said one of said different operations.

10. The method of claim 3 further comprising employing a communication packet in said one of said circular communication buffers; employing as said first end a start of frame of said communication packet; employing as said opposite second end an end of frame of said communication packet; and non-destructively reading said first data before said start of frame without deleting said first data from said one of said circular communication buffers.

11. The method of claim 10 further comprising inputting an identifier of one of said number of said independent communication layers; inputting a number corresponding to the size of said first data; inputting a pointer corresponding to a data space where said first data is to be stored; inputting an object corresponding to said one of said circular communication buffers; and outputting a status from said buffer manager of said one of said different operations.

12. The method of claim 6 further comprising said buffer manager reversing said writing said second data before said start of frame.

13. The method of claim 12 further comprising inputting an identifier of one of said number of said independent communication layers; inputting an object corresponding to said one of said circular communication buffers; and outputting a status from said buffer manager of said reversing.

14. The method of claim 1 further comprising after completing one of said different operations in said buffer manager, returning said one of said circular communication buffers to said buffer manager from said one of said independent communication layers.

15. The method of claim 1 further comprising employing an application framework providing asynchronous communications among said buffer manager and said independent communication layers.

16. The method of claim 1 further comprising leasing said one of said circular communication buffers from said buffer manager by said one of said independent communication layers; and subleasing said one of said circular communication buffers by said one of said independent communication layers to another one of said independent communication layers.

17. A node comprising:
a transceiver; and
a processor comprising
a memory, and
a communication routine,
wherein said memory includes a plurality of circular communication buffers,
wherein said communication routine includes a buffer manager structured to manage said circular communication buffers, a plurality of independent communication layers comprising a physical layer operatively associated with said transceiver, said buffer manager being independent of said independent communication layers,
wherein a number of said independent communication layers are structured to request one of said circular communication buffers from said buffer manager by one of said independent communication layers, and
wherein said buffer manager is further structured to provide a plurality of different operations to read first data from or write second data to said one of said circular communication buffers for a number of said independent communication layers.

18. The node of claim 17 wherein said processor further comprises an application framework providing asynchronous communications among said buffer manager and said independent communication layers.

19. The node of claim 17 wherein said node is a wireless node.

20. A system comprising:
a plurality of nodes, each of said nodes being structured to communicate with a number of others of said nodes, each of said nodes comprising:
a transceiver, and
a processor comprising
a memory, and
a communication routine,
wherein said memory includes a plurality of circular communication buffers,
wherein said communication routine includes a buffer manager structured to manage said circular communication buffers, a plurality of independent communication layers comprising a physical layer operatively associated with said transceiver, said buffer manager being independent of said independent communication layers,
wherein a number of said independent communication layers are structured to request one of said circular communication buffers from said buffer manager by one of said independent communication layers, and
wherein said buffer manager is further structured to provide a plurality of different operations to read first data from or write second data to said one of said circular communication buffers for a number of said independent communication layers.

21. The system of claim 20 wherein said one of said circular communication buffers has a first end and an opposite second end; and wherein said buffer manager is further structured to write said second data as one of said different operations to one of the first end and the opposite second end of said one of said circular communication buffers.

22. The system of claim 20 wherein said one of said circular communication buffers has a first end and an opposite second end; and wherein said buffer manager is further structured to read said first data as one of said different operations from one of the first end and the opposite second end of said one of said circular communication buffers.

23. The system of claim 20 wherein said one of said circular communication buffers has a first end and an opposite second end; wherein said buffer manager is further structured to write said second data as one of said different operations to the opposite second end of said one of said circular communication buffers; and wherein said buffer manager is further structured to write said second data as another one of said different operations to the first end of said one of said circular communication buffers.

* * * * *